United States Patent Office 3,511,716
Patented May 12, 1970

3,511,716
ELECTROCHEMICAL GENERATOR UTILIZING A LITHIUM ANODE, COPPER SULFIDE CATHODE AND NON-AQUEOUS ELECTROLYTES
Jean-Paul Gabano, Poitiers, and Gerard Marcel Gerbier, Biard, France, assignors to Societe des Accumulateurs Fixes et de Traction (Societe Anonyme), Romainville, France, a company of France
Filed Mar. 21, 1968, Ser. No. 718,974
Claims priority, application France, June 30, 1967, 112,759
Int. Cl. H01m 17/02
U.S. Cl. 136—100    7 Claims

ABSTRACT OF THE DISCLOSURE

Electrochemical generators embodying positive electrodes of copper sulfide content, negative electrodes of lithium content and non-aqueous electrolyte comprising a solution of lithium perchlorate in tetrahydrofuran containing in addition a selected percentage of at least one other organic solvent capable of increasing the solubility of lithium perchlorate and selected from the group consisting 1-1 dimethoxyethane and 1-2 dimethoxy in percentage ranging from about 30% to not more than about 60% of the mixture.

RELATED APPLICATIONS

A related application, Ser. No. 643,946, is pending.

BRIEF SUMMARY OF INVENTION

The present invention relates to non-aqueous electrolytes for use in electrochemical generators utilizing lithium as negative active material.

One of the problems raised in this kind of generators is the polarization of the electrodes, more particualrly of the lithium electrode working as anode. Such a polarization is due to the fact that lithium ions going into solution accumulate on the surface of the anode. However, such accumulation is reduced by diffusion and convection phenomena.

Therefore, the diffusion is of first importance in generators designed to deliver high rate currents. It is known from Fick's law that the diffusion mostly depends on the concentration gradient of the species taken into consideration, in the space limited by two planes between which the transfer of the said species is effected by diffusion. In the present case, the oxidized lithium going into solution from the anode must move toward the cathode where it is generally precipitated. This occurs more especially in generators whose cathode is constituted by a metal sulfide such as a copper sulfide, the copper being reduced during discharge by the loss of sulfide ions going into solution, and lithium precipitating as lithium sulfide.

Thus, it can be assumed that the concentraiton of the dissolved lithium at the cathode is practically negligible. Therefore, in order to promote the diffusion, the concentration of dissolved lithium ions must have the highest possible value at the anode, and to this end the solubility of the lithium ions in the solvent must have the highest possible value. It has been found that, when the maximum value of the current for operating without polarization is experimentally determined, the said value is practically proportional to the solubility of the salt formed during the discharge.

In the said earlier application, a non-aqueous electrolyte having a high solvating power which may be used in generators with a lithium anode, is constituted by a solution of lithium perchlorate in tetrahydrofuran.

The results have been satisfactory for cells of small size assembled with a single cathode and having an excess or free electrolyte. However, it has been found that cells provided with several tightly pressed cathodes and anodes and a very small amount of electrolyte showed some anodic polarization due to an inadequate transfer of lithium ions toward the cathode. Moreover, below 10° C. electrolyte conductivity decreases very sharply with the temperature while lithium perchlorate precipitates.

An object of the present invention is to remedy the aforesaid drawbacks.

It relates to a non-aqueous electrolyte having a high solvating power, to be used in electrochemical generators with a lithium negative electrode and of the type in which lithium perchlorate is dissolved in tetrahydrofuran, particularly remarkable in that this electrolyte comprises in addition at least another organic solvent in order to increase the solubility of the lithium perchlorate in the said electrolyte.

According to the invention, the said organic solvent can be constituted by 1-1 dimethoxyethane $$CH_3—CH(OCH_3)_2$$

or 1-2 dimethoxyethane $CH_3—O—(CH_2)_2—OCH$. 

In the case of 1-2 dimethoxyethane the proportion of this compound in the solvent mixture is preferably comprised between 0 and 60%.

The polarization of the electrodes is then much lower since the solubility of the lithium ion is increased, resulting in an increase of the maximum current without polarization. The possibility of increasing the amount of dissolved lithium ions involves the increase of lithium perchlorate solubility and hence, a correlative increase of the electrolyte conductivity. Therefore, this generator operates at a voltage higher than that of a generator of the same kind using a single solvent electrolyte, not only because the polarization of the anode is lower but also because the internal resistance is lower.

Other objects and features of the invention will become apparent from the following detailed description and the accompanying drawings presented by way of example, wherein.

Figure 5:
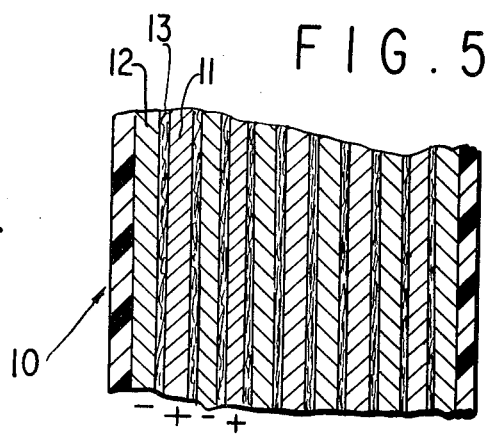
Figure 4:
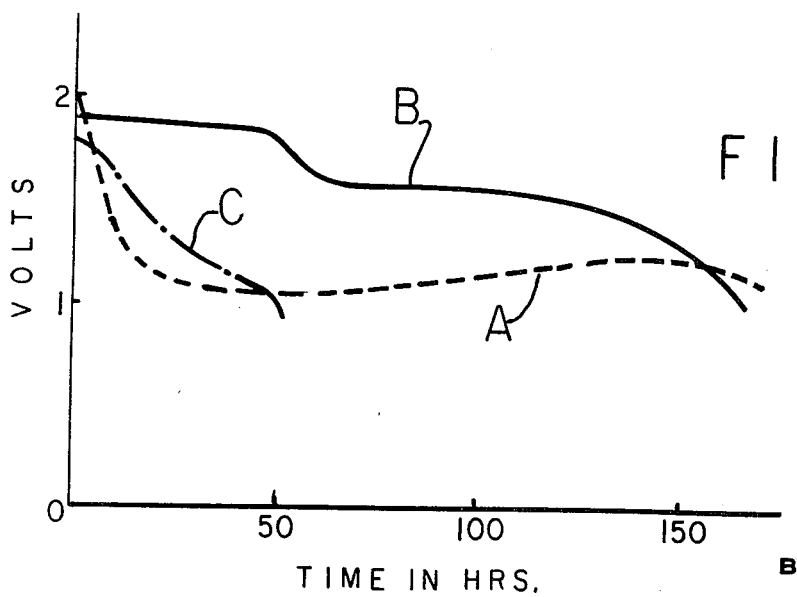

FIG. 4 is a graph which shows the discharge curves of a generator (A) in dotted line, the electrolyte solvent of which is pure tetrahydrofuran, discharged through a 10 ohm resistor, a generator (B) in solid line, the electrolyte of which solvent is a mixture of about 70% tetrahydrofuran and about 30% 1-2 dimethoxyethane, discharged through a 10 ohm resistor, and a generator (C) in dot-dash line identical to (B) discharged through a 3 ohm resistor; and FIG. 5 is a diagrammatic sectional view of a generator embodying the invention.

DETAILED DESCRIPTION

Figure 1:
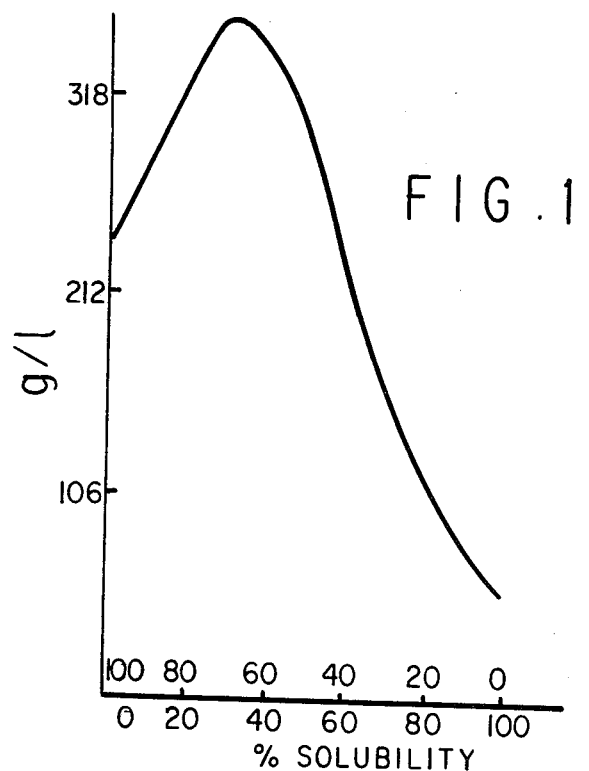
FIG. 1 is a graph which shows the solubility at 25° C. of lithium perchlorate in tetrahydrofuran (THF) and 1-2 dimethoxyethane mixtures plotted against the composition of the mixtures.
Figure 2:
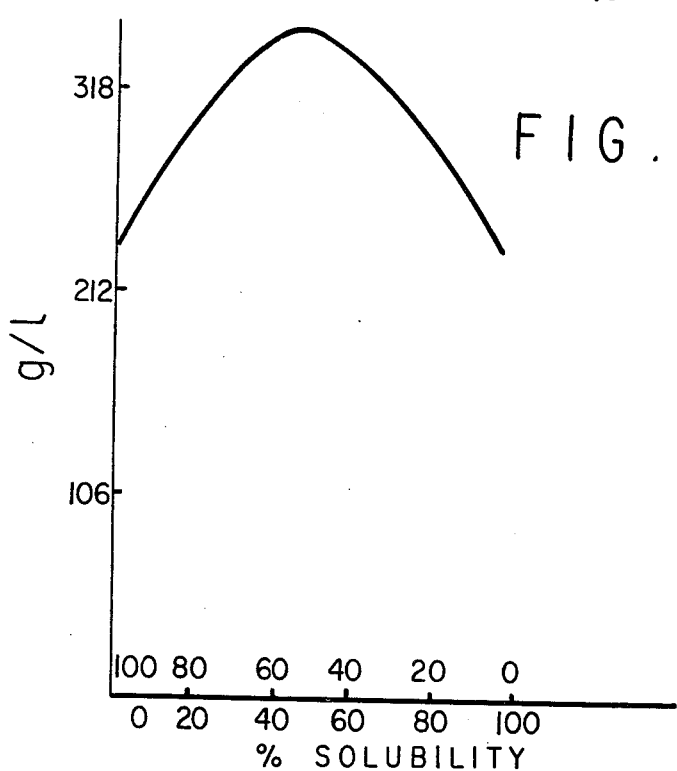
FIG. 2 shows a similar curve in tetrahydrofuran and 1-1 dimethoxyethane mixture.

In the curves shown in FIGS. 1 and 2, the weights in grams of $LiClO_4$ dissolved per liter of mixed solvent appear as ordinates. The solvent composition appears as abscissae in such a way that the ratio of dimethoxyethane is shown as increasing with the abscissae whereas the ratio of tetrahydrofuran is shown as decreasing when the abscissae increases.

It may be seen from these curves that the solubility of LiClO$_4$ is maximum for mixtures comprising the following proportions:

Approximately 70% tetrahydrofuran and approximately 30% 1-1 dimethoxyethane (FIG. 1).

Approximately 54% tetrahydrofuran and approximately 30% 1-2 dimethoxyethane (FIG. 1).

In practice, the use of a mixture comprising 1-2 dimethoxyethane should be preferred since the conductivity is higher for a given perchlorate content.

Figure 3:
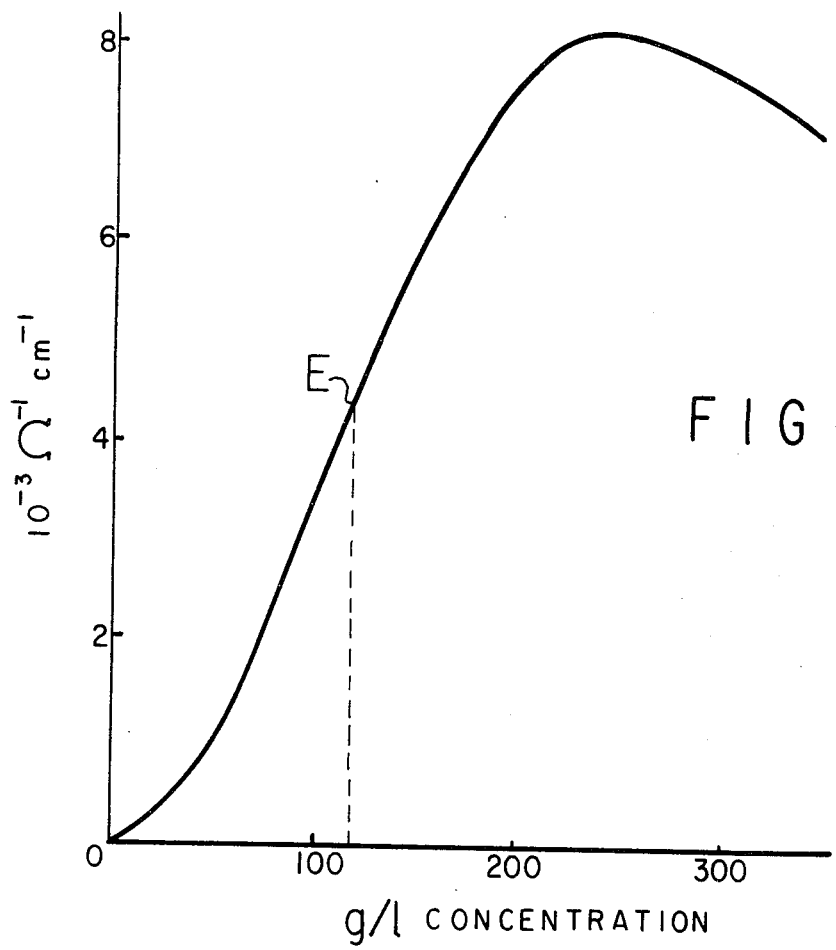
FIG. 3 is a graph which shows the conductivities of a mixture comprising 70% tetrahydrofuran and 30% 1-2 dimethoxyethane plotted against the concentration of dissolved lithium perchlorate.

The curve in FIG. 3 shows the variation of the conductivity of a mixture comprising approximately 70% tetrahydrofuran and approximately 30% 1-2 dimethoxyethane plotted against the content of dissolved lithium perchlorate. The weight of dissolved lithium perchlorate per liter of mixtures appears as abscissae and the conductivity expressed in $10^{-3}\Omega^{-1}\text{cm}.^{-1}$ as ordinates. It may be seen that the conductivity is maximum for about 250 g. of LiClO$_4$ per liter of mixed solvent.

The discharge curves shown in FIG. 4 have been obtained from generators designed as follows and which are illustrated diagrammatically in FIG. 5.

In a prismatic container 10 made of a plastic material such as polyethylene or polypropylene, are placed five positive electrodes 11 made of copper sulfide, 50 mm. long, 50 mm. wide and 1.5 mm. thick, and six negative electrodes 12 made of lithium, 50 mm. long, 50 mm. wide and 1.8 mm. thick for the four inner electrodes and 1.2 mm. thick for the two outer electrodes; separators 13 about 0.3 mm. thick, which may be made of non-woven fabrics of cellulosic or synthetic fibers unattacked by the electrolyte are placed between electrodes of opposite polarity. The copper sulfide positive electrodes 11 are prepared according to the method described in the French patent application 66,739 filed on June 23, 1966 (no corresponding U.S. application) with a further addition of 2 to 4% of acetylene black to improve their conductivity.

The electrolyte in the generator A was constituted by a solution of 110 to 115 g. of lithium perchlorate per liter of tetrahydrofuran (i.e. nearly molar) and in the generators B and C by a similar solution in which pure tetrahydrofuran was replaced by a mixture of about 70% tetrahydrofuran and about 30% 1-2 dimethoxyethane.

Generators A and B were discharged through a 10 ohm resistor and generator C through a 3 ohm resistor.

In FIG. 4, the voltages expressed in volts appear as ordinates and the discharge time expressed in hours as abscissae.

It may be noted from FIG. 4 that in generators B and C, the concentration of perchlorate has not been chosen as that corresponding to the maximum conductivity, since the electrolyte is represented by point E on the curve of FIG. 3. It has been chosen in order to have a valid comparison between this electrolyte and the electrolyte of generator A whose concentration must not be too high to prevent any risk of formation of insoluble salts during the discharge. The curves of FIG. 4 show that though the generator according to the invention does not last longer than generator A where pure tetrahydrofuran is used, on the other hand, the corresponding curve is always situated much above the discharge curve of generator A. The energy density obtained from generator B is twice that of generator A since its value rises from 120 wh./kg. for generator A, taking into account all the components of the generator, to about 250 wh./kg. for generator B, merely by changing the solvent of the electrolyte.

As for generator C discharged through a 3 ohm resistor no similar curve could be obtained from generator A on account of the immediate polarization of the lithium electrodes, which very clearly proves the increase of the maximum discharge rate without polarization when an electrolyte according to the invention is used.

The energetic efficiency of a generator using electrolyte according to the invention is therefore much higher than that of former generators.

The invention has also the advantage of improving low temperature operation. It has been found that the variation with the temperature of conductivity of the electrolyte according to the invention does not exhibit the sharp fall occurring when pure tetrahydrofuran solutions are used. The conductivity slightly decreases with the temperature but slowly and steadily. Thus, there is no risk of sudden precipitation of lithium perchlorate below a certain temperature.

Lastly, generators using the electrolyte according to the invention have shown a good open-circuit charge retention since the loss is only about 5 to 10% after three months.

While specific embodiments of the invention have been disclosed, variations in practice within the scope of the claims are possible and are contemplated. There is no intention, therefore, of limitation to the exact abstract or disclosure herein presented.

What is claimed is:

1. An electrochemical generator containing a lithium negative electrode and a positive copper sulfide electrode and a non-aqueous electrolyte having high solvating power and comprising a solution of lithium perchlorate in tetrahydrofuran organic solvent and in addition a second organic solvent selected from the group consisting of 1-1 dimethoxyethane and 1-2 dimethoxyethane to increase the solubility of the lithium perchlorate.

2. An electrochemical generator as set forth in claim 1, wherein the tetrahydrofuran and the second organic solvent are present in the electrolyte in percentages of approximately 54-70% of tetrahydrofuran and approximately 46-30% of the second organic solvent and the lithium perchlorate is present in the amounts of approximately between 100 and 250 grams per liter of electrolyte.

3. An electrochemical generator according to claim 1 wherein said lithium perchlorate is present in the proportion of 100-250 grams per liter of electrolyte.

4. An electrochemical generator according to claim 1 wherein said second organic solvent is present in the range of from about 30% to not more than about 60%.

5. An electrochemical generator according to claim 1 wherein said second organic solvent is 1-1 dimethoxyethane in the percentage of about 46%.

6. An electrochemical generator according to claim 1 wherein said second organic solvent is 1-2 dimethoxyethane in the percentage of about 30%.

7. An electrochemical primary generator of high specific energy and efficiency comprising a positive electrode of copper sulfide content, a negative electrode of lithium, a separator between the electrodes and a non-aqueous electrolvte having high solvating power and comprising a solution of lithium perchlorate in tetrahydrofuran organic solvent and at least one other organic solvent to increase the solubility of the lithium perchlorate, said last-named organic solvent being selected from the group consisting of 1-1 dimethoxyethane and 1-2 dimethoxyethane.

References Cited

UNITED STATES PATENTS

| | | | |
|---|---|---|---|
| 3,073,884 | 1/1963 | Pinkerton | 136—154 |
| 3,098,770 | 7/1963 | Horowitz et al. | 136—153 |
| 3,185,590 | 5/1965 | Mayer et al. | 136—153 |
| 3,413,154 | 11/1968 | Rao | 136—100 |

WINSTON A. DOUGLAS, Primary Examiner

C. F. LE FEVOUR, Assistant Examiner

U.S. Cl. X.R.

136—155

PO-1050
(5/69)

UNITED STATES PATENT OFFICE
CERTIFICATE OF CORRECTION

Patent No. 3,511,716      Dated May 12, 1970

Inventor(s) Jean-Paul Gabano, et al.

It is certified that error appears in the above-identified patent and that said Letters Patent are hereby corrected as shown below:

Col. 1, line 23, "dimethoxy" should read ---dimethoxyethane---.

Col. 2, line 25, "OCH" should read ---$OCH_3$---.

Col. 3, line 7, "1-1" should read ---1-2---;

Col. 3, line 9, "30%" should read ---46%---;

also "1-2 should read ---1---; and also "Fig. 1" should read ---Fig. 2---.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents